(12) United States Patent
Ooishi et al.

(10) Patent No.: US 7,564,218 B2
(45) Date of Patent: Jul. 21, 2009

(54) BATTERY MONITORING DEVICE FOR HYBRID VEHICLE

(75) Inventors: Manabu Ooishi, Shizuoka (JP); Satoshi Ishikawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 277 days.

(21) Appl. No.: 11/646,476

(22) Filed: Dec. 28, 2006

(65) Prior Publication Data
US 2007/0182348 A1 Aug. 9, 2007

(30) Foreign Application Priority Data
Feb. 1, 2006 (JP) ............................. 2006-024667

(51) Int. Cl.
H01M 10/46 (2006.01)
(52) U.S. Cl. .................................................. 320/118
(58) Field of Classification Search ................. 320/104, 320/110, 116, 117, 118, 122
See application file for complete search history.

(56) References Cited

U.S. PATENT DOCUMENTS

| 5,998,969 | A  | * | 12/1999 | Tsuji et al. ................... 320/132 |
| 6,762,588 | B2 | * | 7/2004  | Miyazaki et al. ............. 320/116 |
| 6,828,757 | B2 | * | 12/2004 | Furukawa .................... 320/116 |
| 2003/0143675 | A1 | * | 7/2003 | Curtis et al. ................ 435/69.1 |

FOREIGN PATENT DOCUMENTS

JP    11-176480    7/1999

* cited by examiner

*Primary Examiner*—Edward Tso
(74) *Attorney, Agent, or Firm*—Kratz, Quintos & Hanson, LLP

(57) ABSTRACT

A voltage measuring circuit 11 measures a voltage of a block B1. Then, a voltage measuring circuit 12 measures a voltage of a block B2. Then, the voltage measuring circuit 11 measures again the voltage of a block B1. A low voltage CPU judges that an in-vehicle battery is abnormal if the measured voltage is out of predetermined upper and lower limits, or a voltage difference between the block B2 and the block B1 measured again is more than a predetermined value.

3 Claims, 4 Drawing Sheets

BATTERY MONITORING DEVICE FOR HYBRID VEHICLE

CROSS REFERENCE TO RELATED APPLICATIONS

This application is based on Japanese Patent Application No. 2006-024667, the contents of which are hereby incorporated by reference.

BACKGROUND OF THE INVENTION

1. Field of the Invention

The present invention relates to a voltage-measuring device in particular, to a voltage-measuring device for measuring voltage of an in-vehicle high voltage battery that consists of a plurality of rechargeable batteries connected in series with each other.

2. Description of the Related Art

Recently, a hybrid car (hereafter referred to as HEV) that runs using an electric motor together with the engine has become widespread. This HEV includes a low voltage battery for starting engine, and a high voltage battery for driving the electric motor. The high voltage battery consists of a plurality of rechargeable batteries, such as a nickel-hydrogen battery or a lithium battery connected in series with each other.

After repeating charge and discharge, a state of charge (SOC) of each rechargeable battery of the high voltage battery varies. Regarding the charge and discharge of the battery, from a viewpoint of durability of each rechargeable battery and safety, when the rechargeable battery having the highest SOC reaches the upper limit SOC, the charge cycle stops, and when the rechargeable battery having the lowest SOC reaches the lower limit SOC, the discharge cycle stops. Regarding HEV, battery energy is added to a gasoline engine when going up a hill, and the energy is regenerated and stored in the battery. Therefore, the voltage of the high voltage battery often changes by the state of running. Thus, it is necessary to always observe the voltage of a high-voltage battery while the HEV is running.

Japanese published patent application No. Hei 11-176480 discloses a voltage-measuring device that measures voltage of each rechargeable battery that composes the high voltage battery. In this voltage-measuring device, a main battery (high voltage-battery) is divided into a plurality of modules, and after measuring a voltage of each module, the device measures a total voltage of the entire main battery. Then, the device judges whether the voltage of each module and the total voltage of the main battery are abnormal or not. If both of the voltages are normal, the device repeats the processing, and if both of the voltages are abnormal, the device informs of the battery abnormality, and stops the charge and discharge cycle.

The voltage measuring device described above measures the voltage of each module, then measures the total voltage of the main battery, and judges whether both of the voltages are abnormal or not. Therefore, there is a problem of taking time to the detection of abnormality. Further, when a big change of a voltage is measured at a certain module compared with other modules, the judgment whether it is caused by the change of the current value that the main battery supplies (for instance, change of the running state of the HEV) or by abnormality of the rechargeable battery is late.

Accordingly, an object of the present invention is to provide a voltage-measuring device to rapidly detect an abnormality of a high voltage battery consisting of rechargeable batteries connected in series with each other when judging the abnormality.

SUMMARY OF THE INVENTION

In order to attain the object, according to the present invention, there is provided a voltage measuring device for an in-vehicle high voltage battery consisting of a plurality of rechargeable batteries connected in series with each other, said device including: voltage measuring members respectively mounted on a plurality of blocks for measuring voltages of the blocks, each of which having at least one rechargeable battery; a control member for causing the voltage measuring members of two different blocks to alternately measure voltages three times or more, followed by judging abnormality of the in-vehicle high voltage battery on the basis of the measured voltages, then repeating the same measuring and judging for other combinations of two different blocks in turn.

Preferably, after the control member causes the two voltage measuring members to measure the voltages of the respective blocks, when a difference between the two measured voltages is equal to or more than a predetermined value, the control member judges that the in-vehicle high voltage battery is abnormal.

Preferably, when at least one of the measured voltage values is out of a region of predetermined voltage values, the control member judges that the in-vehicle high voltage battery is abnormal.

These and other objects, features, and advantages of the present invention will become more apparent upon reading of the following detailed description along with the accompanied drawings.

DETAILED DESCRIPTION OF THE PREFERRED EMBODIMENTS

Figure 1:
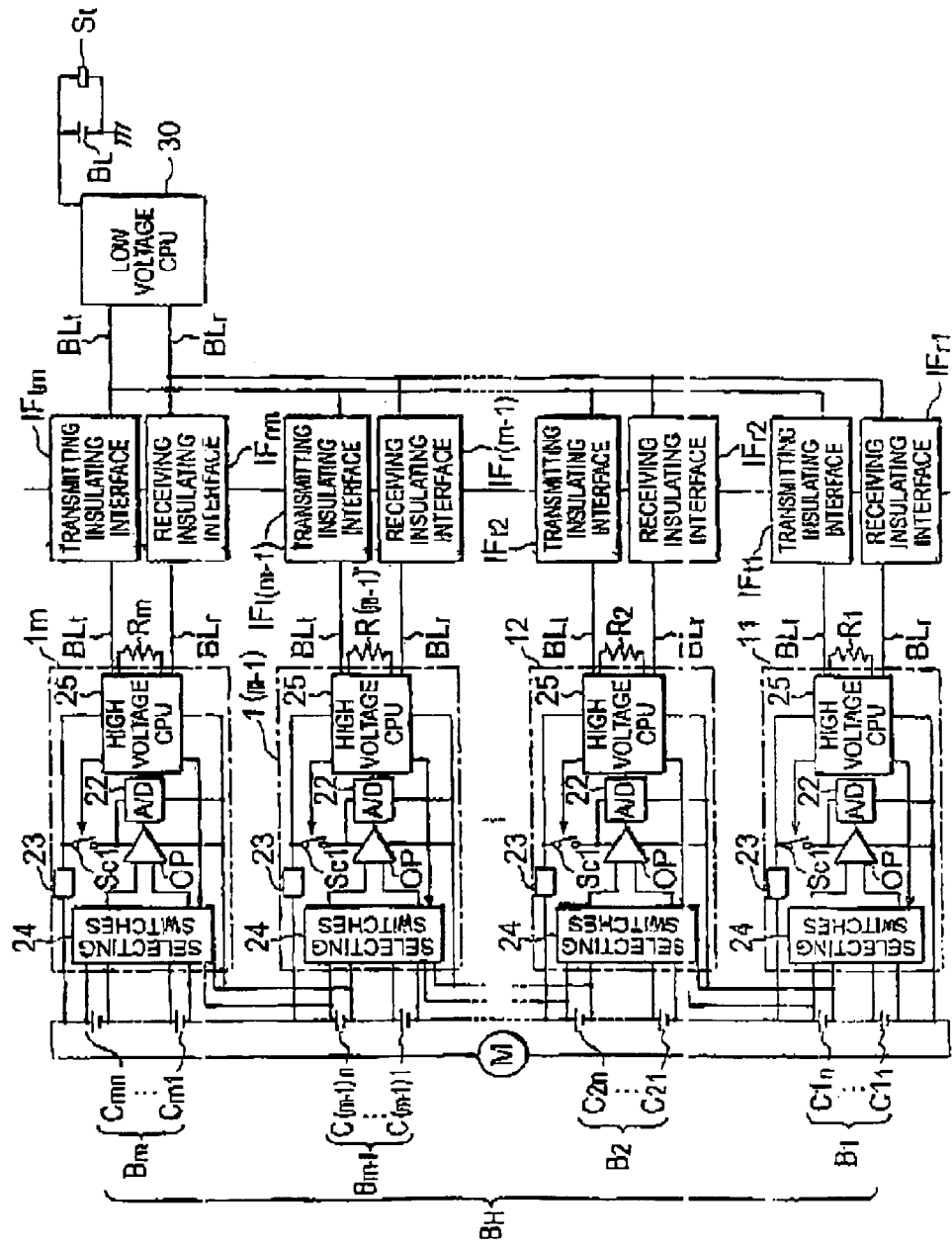
FIG. 1 is a circuit diagram showing an embodiment of a voltage-measuring device according to the present invention.

A first embodiment of a voltage-measuring device according to the present invention will be described with reference to Figures. In FIG. 1, a reference symbol BL indicates a low voltage battery. As shown in FIG. 1, the low voltage battery BL consists of, for example, a rechargeable battery. The BL is used for operating a stator St that starts an engine. If necessary, an alternator utilized as a charger is connected to both ends of the BL.

A reference symbol BH indicates a high voltage battery. The high voltage battery is used for a power for an electric motor M of the HEV. If necessary, the motor M as a load or the alternator as a charger is connected to both ends of the BH.

The high voltage battery BH is divided into m blocks B1 to Bm (where m is an optional integer). Each of blocks B1 to Bm consists of n rechargeable batteries C11 to Cmn (n is an optional integer). Each of the rechargeable batteries C1 to Cmn supplies the same voltage and the same current, and is connected in series with the other. The rechargeable batteries C1n, C2n, . . . C(m-1)n that are disposed in boundaries with adjoining blocks are common rechargeable batteries to which both voltage measuring circuits 11 to 1m can measure. Namely, the common rechargeable battery C1n is connected to both the voltage measuring circuits 11 and 12, the common rechargeable battery C2n is connected to the voltage measuring circuit 11 and 13, and the common rechargeable battery C(m-1)n is connected to the voltage measuring circuit 1(m-1) and 1m.

The voltage measuring device includes a voltage measuring circuits 11 to 1m as voltage measuring means, a CPU 30 in a low voltage system as a control means, transmitting interfaces IFt1 to IFtm, and receiving interfaces IFr1 to IFrm.

The voltage measuring circuits 11 to 11m correspond to blocks B1 to Bm. The voltage measuring circuits 11 to 11m are powered by the rechargeable batteries C11 to Cmn composing the corresponding block B1 to Bm. Namely, grounds of the voltage measuring circuits 11 to 1m are respectively connected to cathode terminals of the corresponding blocks B1 to Bm. Thus, a voltage of devices composing the voltage measuring circuits 11 to 1m can be measured.

Each of the voltage measuring circuit 11 to 1m includes: a differential amplifier OP for measuring the voltage of the corresponding block and the voltage of the rechargeable batteries C11 to Cmn in the block; selective switches 24 for connecting the corresponding block B1 to Bm or rechargeable batteries C11 to Cmn composing the block to the differential amplifier OP; an A/D converter 22 for converting the voltage measured by the differential amplifier OP to digital values; a CPU 25 for a high voltage system for switching the selective switches 24. The selective switches consist of normally close switches connected to both ends of the rechargeable batteries C11 to Cmn. Here, the voltage between both ends of the block means the voltage between one end and the other end of the rechargeable batteries connected in series to each other in the block, for example, a voltage between a cathode of C11 and an anode of C1n in block B1.

Further, each of the voltage measuring circuits 11 to 1m includes: a high voltage power circuit 23 for outputting a constant voltage as an operating power of the differential amplifier OP, A/D converter 22, and the high voltage CPU 25 inputted from the source batteries of blocks B1 to Bm; and a breaker switch Sc1 interposed between the high voltage power circuit 23, and the operational amplifier OP and A/D converter 22. The high voltage CPU 25 controls this breaker switch Sc1.

Each of the voltage measuring circuits 11 to 1m is made of one chip. External resistors R1 to Rm are connected to the voltage measuring circuits 11 to 1m respectively. The external resistors R1 to Rm correspond to addresses of the blocks B1 to Bm, and have different values. The high voltage CPU 25 reads the resistance values of the external resistors R1 to Rm corresponding to turning on of each high voltage power circuit 23, and stores the values as addresses of each high voltage CPU 25 in a not-shown store device.

The low voltage CPU 30 includes a not-shown memory and operates under a power supply from a low voltage battery BL. The CPU 30 controls the voltage measuring circuits 11 to 1m according to a program stored in the memory, a measuring route, and upper and lower voltages of the blocks.

A transmitting bus line BLt and a receiving bus line BLr are provided between the voltage measuring circuits 11 to 1m and the low voltage CPU 30. The transmitting bus line BLt and the receiving bus line BLr respectively branches from the low voltage CPU 30 to the voltage measuring circuits 11 to 1m. Insulated transmitting interfaces IFt1 to IFtm and insulated receiving interfaces IFr1 to IFrm are respectively provided on the transmitting bus line BLt and the receiving bus line BLr after branched. Namely, branch points of the transmitting bus line BLt and the receiving bus line BLr are provided at the low voltage CPU 30 side and not at the insulated transmitting interfaces IFt1 to IFtm and insulated receiving interfaces IFr1 to IFrm sides.

The insulated transmitting interfaces IFt1 to IFtm and insulated receiving interfaces IFr1 to IFrm connect the voltage measuring circuits 11 to 1m to the low voltage CPU 30 while they are electrically insulated to each other. Thus, the high voltage battery BH and the low voltage battery BL are insulated from each other. As the insulated transmitting interfaces IFt1 to IFtm, for example, a photo coupler consisting of a light emitting device and a light receiving device or a magnetic coupler are already known.

Figure 2:
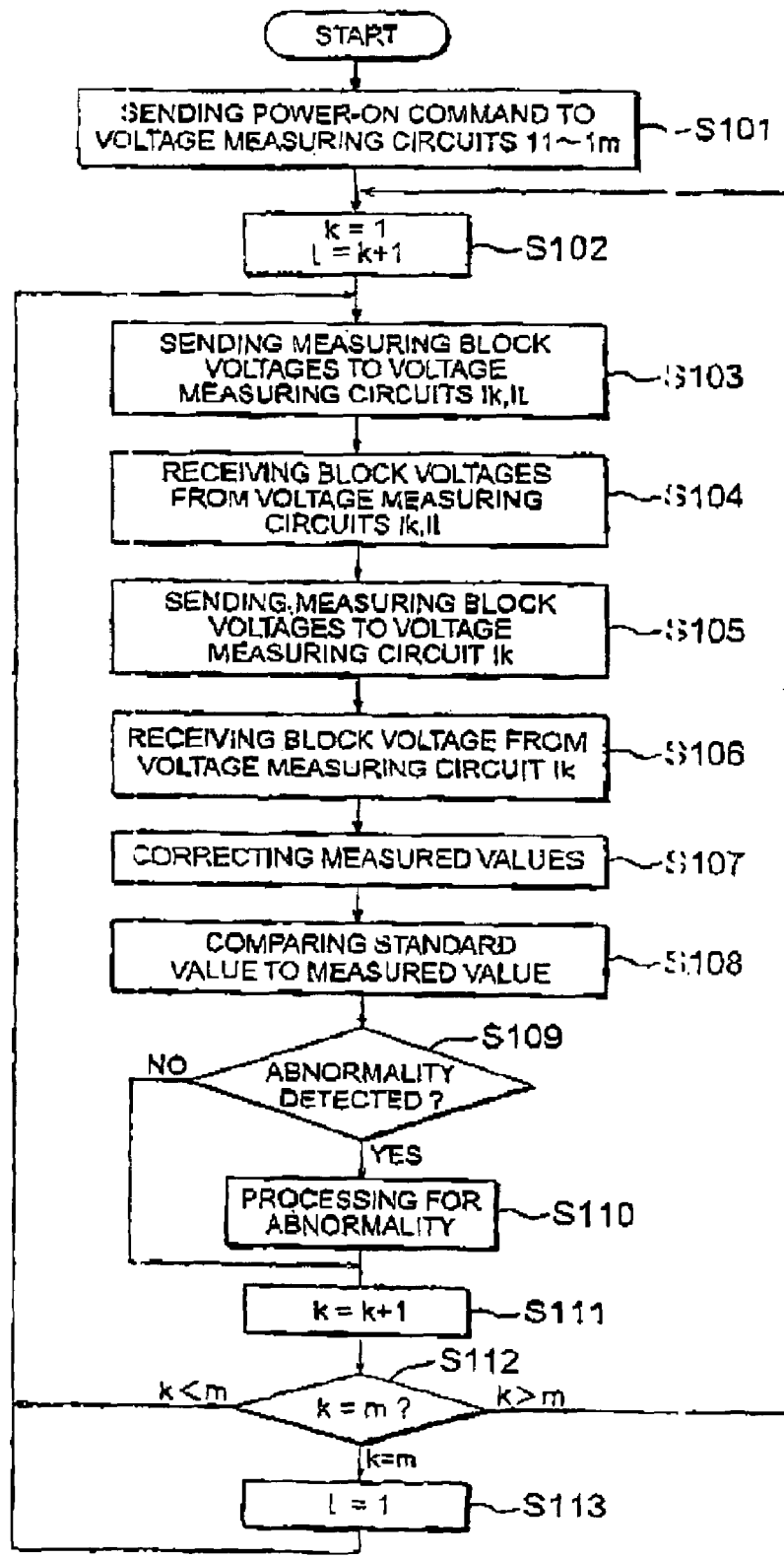
FIG. 2 is a flow chart showing a processing procedure where a low voltage system CPU 30 that composes the voltage-measuring device shown in FIG. 1 detects abnormality from the both voltages that two voltage measuring circuits measured.
Figure 3A:
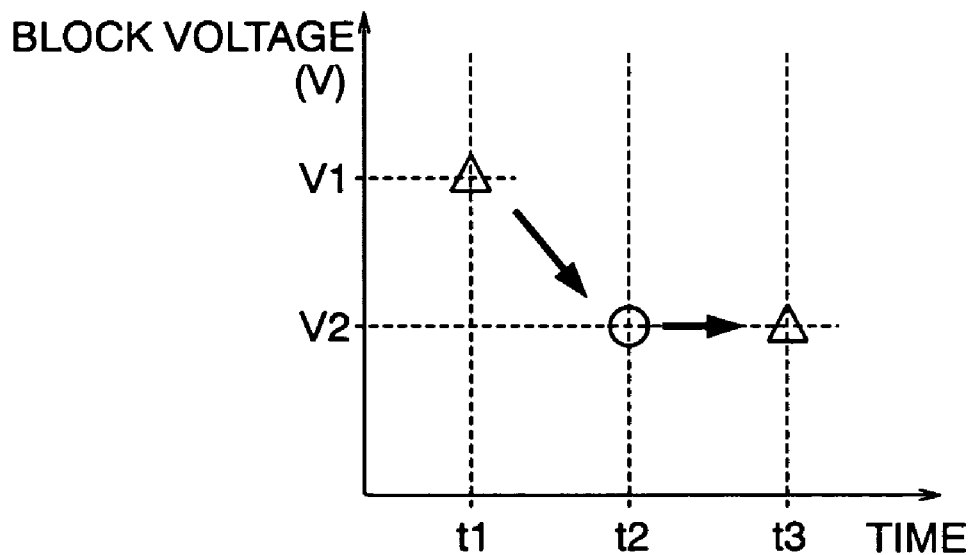
FIGS. 3A and 3B are explanatory views showing a change of a block voltage.
Figure 3B:
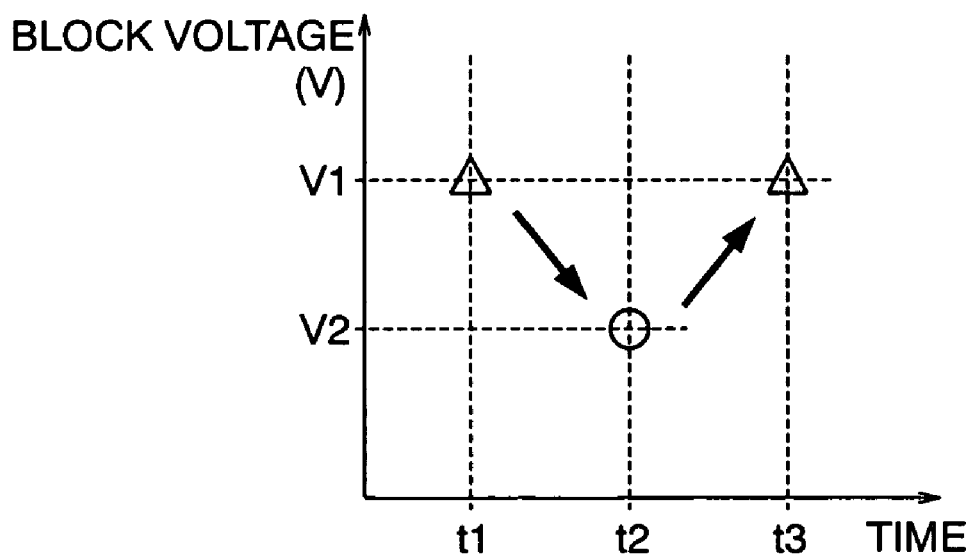
Figure 4:
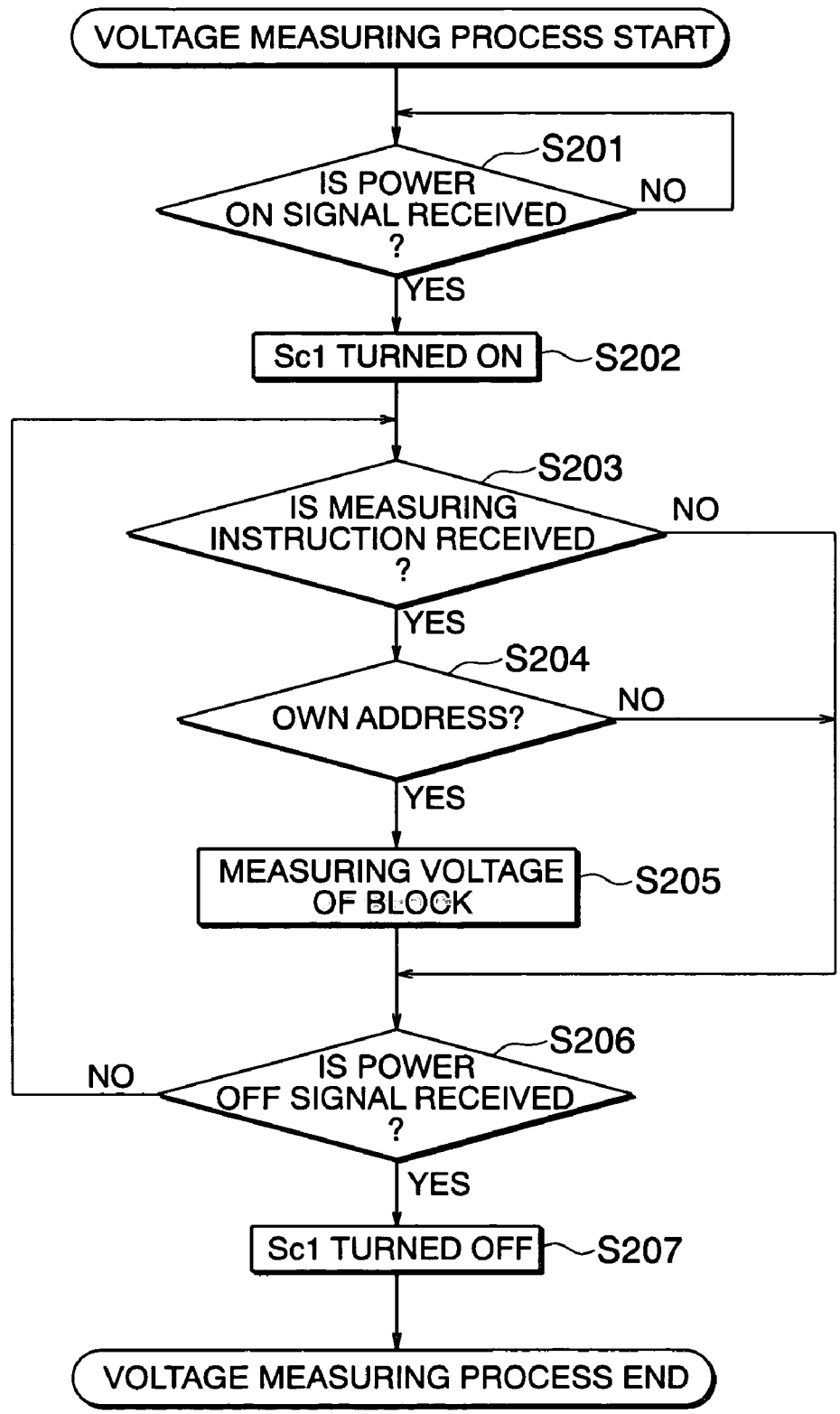
FIG. 4 is a flow chart showing a processing procedure in which a CPU 25 in a high voltage system forming the voltage-measuring device in FIG. 1 measures the block voltage.

FIGS. 2 to 4 show a procedure for measuring the voltages of blocks B1 to Bm, and judging abnormality from the voltages in the above voltage measuring device. The low voltage CPU 30 and the high voltage CPU 25 carry out flow charts in FIGS. 2 and 4 when an ignition switch of the HEV is on. Namely, the low voltage CPU 30 executes the flow chart in FIG. 2, to make the voltage measuring circuits 11 to 1m measure the voltages of the blocks and judge the abnormality. The high voltage CPU 25 executes the flow chart shown in FIG. 4 to measure the voltages of the blocks.

First, in FIG. 2, a procedure for measuring the voltages of the blocks by the voltage measuring circuits will be explained. In step S101, the voltage measuring circuits 11 to 1m are turned on and then the procedure goes to step S103.

In step S102, variables k and l indicating both the voltage measuring circuit and the block number is set to 1 and the procedure goes to step S103.

Next, in step S103, the voltage measuring circuit 1k measures the voltage and the voltage measuring circuit 1l measures the voltage. Then, the procedure goes to step S104. For example, when the step is from step S102, the voltage measuring circuit 11 measures the voltage of the block B1, and the voltage measuring circuit 12 measures the voltage of the block B2.

Next, in step S104, the CPU 30 receives voltages V1k and V1l corresponding to the voltage measuring circuits 1k and 1l, and stores the voltage values in the memory in the CPU 30. Then, the procedure goes to step S105.

In the step S105, the voltage measuring circuit 1k again measures the voltage V1k' and the CPU 30 stores the voltage data in the memory. Then, the procedure goes to step S107. Namely, in step S103 to S106, two voltage measuring circuits measure voltages of the blocks three times.

Next, in step S107, transmitted voltage values are corrected owing to a measuring error between the measuring circuits. Then, the procedure goes to step S108. The correction between the voltage measuring circuits is done as follows. Previously, while the ignition switch is off, voltages of each of common rechargeable batteries C1n, C2n . . . C(m-1)n are measured by two voltage measuring circuits having the common rechargeable batteries. A difference between the voltages of the two rechargeable batteries is a measuring error. The correction is done by adding the measuring error to the voltage of the block.

Next, in step 108, whether the voltage V1k, V1l, V1k' corrected in step S107 are between an upper limit voltage and a lower limit voltage on product standard of rechargeable battery in the block previously stored in the memory is judged. Namely, whether the measured voltage is within the predetermined voltage value or not is judged. Then, the CPU 30 compares the V1$k$, V1$l$, V1$k'$ and goes to step S108. The voltages V1$k$, V1$l$, V1$k'$ are compared as follows. When a difference between V1$k$ and V1$l$ is more than the predetermined value stored in The memory of the law voltage CPU, and a difference between V1$l$ and V1$k'$ is less than the predetermined value, the CPU 30 judges normal because the voltages of the blocks are changed owing to a change of the vehicle's running state. When the difference between V1$k$ and V1$l$ is more than the predetermined value, and the difference between V1$l$ and V1$k'$ is more than the predetermined value, the CPU judges that the block B$k$ or the block B$l$ is abnormal because it is thought that the change is not owing to the change of the vehicle's running state. When The difference between V1$k$ and V1$l$ is less than the predetermined value and the difference between V1$l$ and V1$k'$ is more than the predetermined value, th CPU judges that the block B$k$ or the block B$l$ is abnormal. Namely, when the difference between V1$l$ and V1$k'$ is more than the predetermined value, the CPU 30 judges that the high voltage battery BH is abnormal.

As an example, the blocks B1 and B2 (k=1, l=k+1) will be explained with reference to FIGS. 3A and 3B. First, in FIG. 3A, the voltage measuring circuit 11 measures the voltage of the block B1 at a time t1 and the measured voltage is V1. Then, the voltage measuring circuit 12 measures the voltage of the block B2 at a time t2 and the measured voltage is V2. The difference between V1 and V2 is more than the predetermined voltage. Then, the voltage measuring circuit 11 measures again the voltage of the block B1 at a time t3 and the measured voltage is around V2 (namely within the predetermined value). In this case, the CPU 30 judges that such a voltage shift is caused by for example running on a slope at the time after t1. However, as shown in FIG. 3B, if the voltage of block B1 measured at the time t3 is around V1 (namely more than the predetermined value), the CPU 30 judges that the block B1 or B2 is abnormal. Here, the difference more than the predetermined value is a detectable voltage shift caused by charge or discharge of the rechargeable battery.

Next, in step S109, when in step S108 the measured voltages are over the block voltage of a product standard (more than the upper limit voltage or less than the lower limit voltage), or the voltage difference is judged abnormal, the procedure goes to step S110. When the measured voltages are within the block voltage of the product standard, and the voltage difference is judged normal, the procedure goes to step S111.

In step S110, the CPU 30 sends to a not-shown higher unit that the high voltage battery BH is abnormal, and then the procedure goes to step S111. According to the received data, the higher unit warns a HEV driver and prohibits the charge and discharge to the high voltage battery.

Next, in step S111, the CPU 30 adds the variable k to 1, and adds the variable l to 1. In step S112, if the result is less than m, the procedure goes back to step S103. If the result is more than m, the step goes back to step S102. If the result is m, the procedure goes to step S113.

In step S113, the variable l is set to 1, and then the procedure goes back to step S103. Thus, the voltage measuring circuits 1$m$ and 11 measure.

Namely, according to this flow chart, voltages of two different blocks are measured three times, and the abnormality of the high voltage battery can be detected.

Next, a procedure to measure the voltage of the blocks by the high voltage CPU 25 of the voltage measuring circuits 11 to 1$m$ corresponding to the voltage measuring command which is sent from the low voltage CPU 30 to the voltage measuring circuits at steps S103 and S105 of the flowchart in FIG. 2 will be explained with reference to the flowchart of FIG. 4.

First, in step S201, the CPU 25 judges that the power-on signal is received or not. The power-on signal is sent from the low voltage CPU 30 through the bus line BLt and interfaces IFt1 to IFtm to the voltage measuring circuits 11 to 1$m$. When the signal is received (yes), the procedure goes to step S202. When the signal is not received (no), step S201 is repeated until the CPU 25 receives the signal.

Next, in step S202, breaker switches Sc1 of the voltage measuring circuits 11 to 11$m$ are turned on. Thus, power is supplied from blocks B1 to Bm to the differential amplifiers OP and A/D converters 22, which constitute the measuring circuits 11 to 11$m$.

Next, in step S203, the CPU 25 judges whether a measuring instruction is received or not. The measuring instruction is transmitted from the low voltage CPU 30 to voltage measuring circuits 11 to 1$m$ through the transmitting bus line BLt and the transmitting interfaces IFt1 to IFtm. If the instruction is received (YES), the procedure goes to step S204. If the instruction is not received (NO), the procedure goes to step S206.

In step S204, the CPU 25 judges whether an address designated by the measuring instruction received in step S203 is its own address or not. If it is its own address, the procedure goes to step S205. If it is not its own address, the procedure goes to step S206.

Next, in step S205, the CPU 25 measures the block voltage, and then the procedure goes to step S206. The high voltage CPU 25 connects both ends of the block to the differential amplifier OP. Thus, a digital value of the block voltage is supplied to the high voltage CPU 25 from the A/D converter 22. In response to this, the high-voltage CPU 25 transmits the digital value of the voltage of the block, to which its own address is designated, to the receiving interfaces IFr1 to IFrm. The digital value of the voltage of the block transmitted to the receiving interfaces IFr1 to IFrm is transmitted to the low voltage CPU 30 through the receiving bus line BLr.

In step S206, the CPU 25 judges whether or not a power off signal, which is transmitted from the low voltage CPU 30 to each of the voltage measuring circuits 11-1$m$ through the transmitting bus line BLt and the transmitting interfaces IFt1 to IFtm, is received. Then, if judged received (YES), the procedure goes to step S207. On the other hand, if judged not received (NO), the procedure returns to step S203.

In step S207, the breaker switches Sc1 of the voltage measuring circuits 11 to 1$m$ are turned off. Thereby, electric power from the corresponding block B1 to Bm to the differential amplifier OP and the A/D converter 22, which constitute the corresponding voltage measuring circuit 11 to 1$m$, is shut off.

According to the voltage measuring device, for example, the device measures the voltage of the block B1, then measures the voltage of block B2, and then measures again the voltage of the block B1. Namely, the device measures three times with two voltage measuring circuits. Thus, abnormality of the in-vehicle high voltage battery can be rapidly detected. Namely, because the in-vehicle high voltage battery BH is divided into a plurality of blocks B1 to Bm, and the CPU 30 judges the abnormality of the voltages of two blocks, the device can detect the abnormality of the high voltage battery BH earlier than a system judging after all the voltages of the blocks B1 to Bm are measured.

Further, according to the voltage measuring device, the device measures alternately the voltages of the blocks, for example, measuring the voltage measuring circuit 11, measuring the voltage measuring circuit 12, measuring the voltage measuring circuit 11 again, and when the difference between the voltage of the voltage measuring circuit 12 and the voltage measured by the measuring circuit 11 again is more than the predetermined value, the device can judge that the high voltage battery BH is abnormal. Namely, measuring alternately three times the voltages, and judging whether the difference is more than the predetermined value allows to judge whether the voltage change between the blocks B1 and B2 is owing to a change of running state or owing to the abnormality of the rechargeable battery in the block. Namely, it is possible to detect the abnormality of the high voltage battery BH even if not measuring the batteries of all the blocks 11 to 1*m*. Therefore, the abnormality of the in-vehicle high voltage battery BH can be rapidly detected.

Further, when the voltage of the block measured by, for example, the voltage measuring circuits 11, 12 is out of a predetermined range (over the upper limit or under the lower limit), the device can judge that the block is abnormal. Namely, it is possible to detect the abnormality of the high voltage battery BH even if not measuring the batteries of all the blocks 11 to 11*m*. Therefore, the abnormality of the in-vehicle high voltage battery BH can be rapidly detected.

Incidentally, in the above embodiment, the two voltage measuring circuits adjacent to each other measure the voltage of the block to detect the abnormality of the in-vehicle high voltage battery. However, it is not necessary that the voltage measuring circuits are adjacent to each other.

Further, in the above embodiment, the voltages of the blocks are measured three times by two voltage measuring circuits. However, it is possible that the voltages are measured not less than three times.

Further, in the above embodiment, the high-voltage battery is composed of electric cells each consisting of a rechargeable battery. However, instead, the high-voltage battery may be composed of unit batteries or unit cells each consisting of a secondary battery.

Although the present invention has been fully described by way of example with reference to the accompanying drawings, it is to be understood that various changes and modifications will be apparent to those skilled in the art. Therefore, unless otherwise noted such changes and modifications departing from the scope of the present invention presently defined, should be construed as being included therein.

What is claimed is:

1. A voltage measuring device for an in-vehicle high voltage battery consisting of a plurality of rechargeable batteries connected in series with each other, said device comprising:
   voltage measuring members respectively mounted on a plurality of blocks for measuring voltages of blocks, each of which having at least one rechargeable battery;
   a control member for causing the voltage measuring members of two different blocks to alternately measure voltages three times or more, followed by judging abnormality of the in-vehicle high voltage battery on the basis of the measured voltages, then repeating the same measuring and judging for all other combinations of two different blocks in turn.

2. The voltage-measuring device as claimed in claim 1, wherein after the control member causes the two voltage measuring members to measure the voltages of the respective blocks, when a difference between the two measured voltages is equal to or more than a predetermined value, the control member judges that the in-vehicle high voltage battery is abnormal.

3. The voltage-measuring device as claimed in claim 1, wherein when at least one of the measured voltage values is out of a region of predetermined voltage values, the control member judges that the in-vehicle high voltage battery is abnormal.

* * * * *